Sept. 18, 1962 R. A. HIGONNET ETAL 3,054,335
TYPE COMPOSING APPARATUS
Filed June 12, 1958 6 Sheets-Sheet 1

INVENTORS
RENE A. HIGONNET
LOUIS M. MOYROUD
BY KENWAY, JENNEY, WITTER & HILDRETH

ATTORNEYS

Sept. 18, 1962  R. A. HIGONNET ETAL  3,054,335
TYPE COMPOSING APPARATUS
Filed June 12, 1958  6 Sheets-Sheet 2

INVENTORS
RENE A. HIGONNET
LOUIS M. MOYROUD
BY KENWAY, JENNEY, WITTER & HILDRETH
ATTORNEYS

Sept. 18, 1962  R. A. HIGONNET ETAL  3,054,335
TYPE COMPOSING APPARATUS

Filed June 12, 1958  6 Sheets-Sheet 3

INVENTORS
RENE A. HIGONNET
LOUIS M. MOYROUD
BY KENWAY, JENNEY, WITTER & HILDRETH

ATTORNEYS

Sept. 18, 1962 R. A. HIGONNET ETAL 3,054,335
TYPE COMPOSING APPARATUS
Filed June 12, 1958 6 Sheets-Sheet 4

INVENTORS
RENE A. HIGONNET
LOUIS M. MOYROUD
BY
KENWAY, JENNEY, WITTER & HILDRETH

ATTORNEYS

Sept. 18, 1962 R. A. HIGONNET ETAL 3,054,335
TYPE COMPOSING APPARATUS
Filed June 12, 1958 6 Sheets-Sheet 5
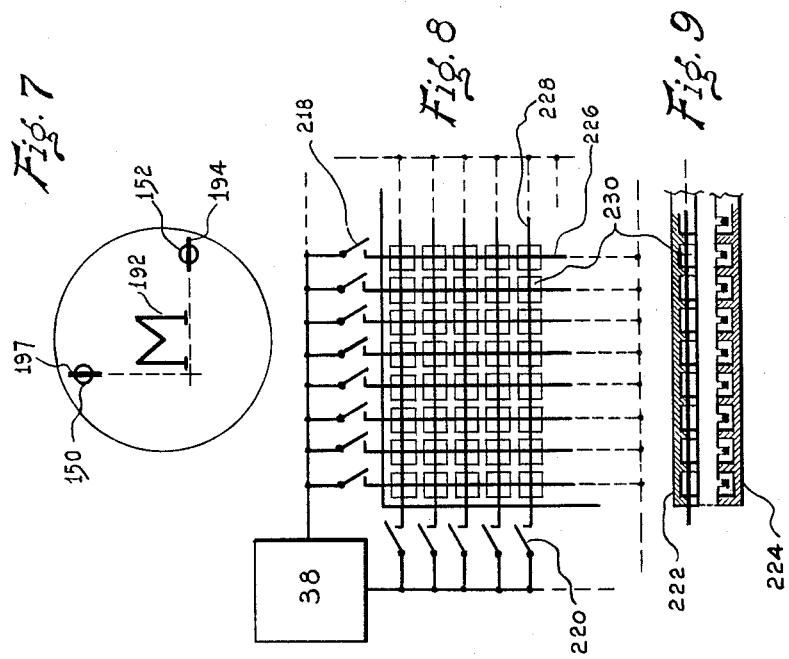
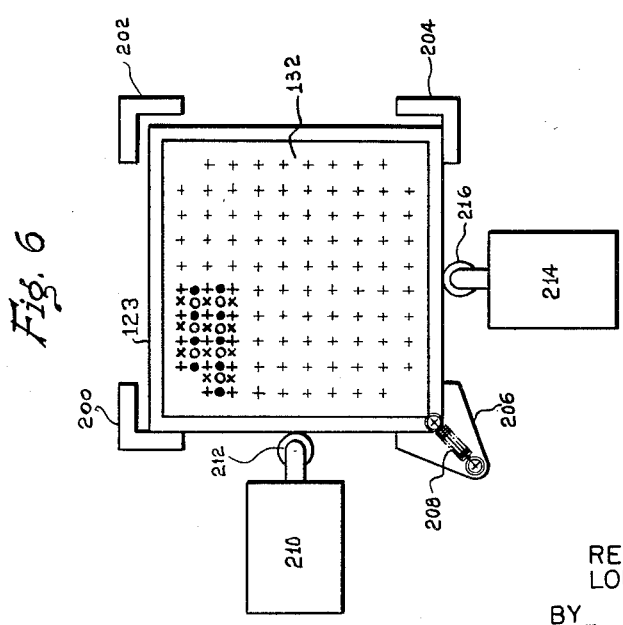
INVENTORS
RENE A. HIGONNET
LOUIS M. MOYROUD
BY KENWAY, JENNEY, WITTER & HILDRETH
ATTORNEYS

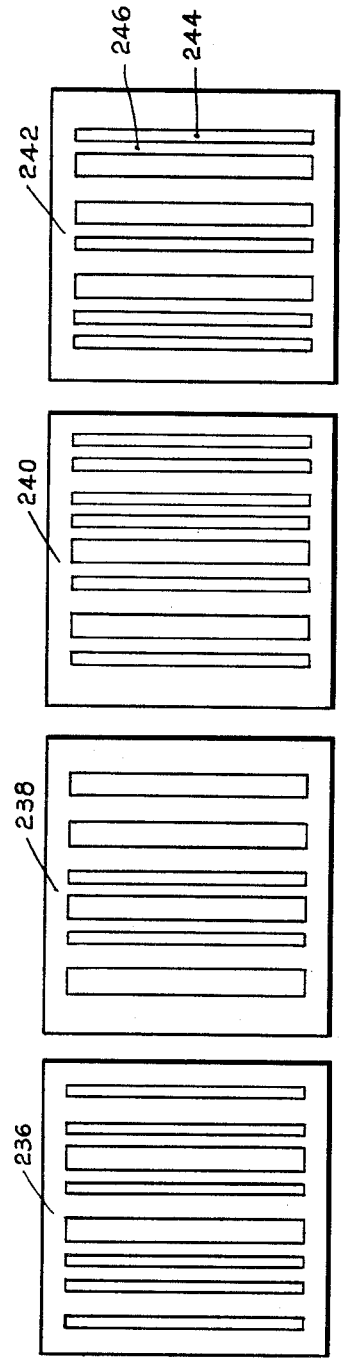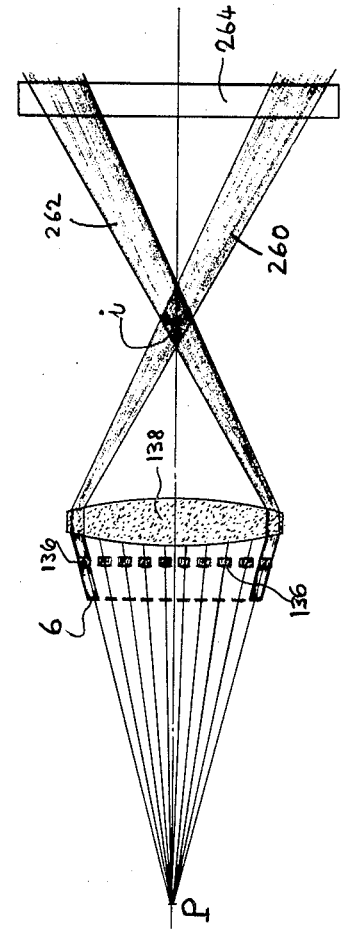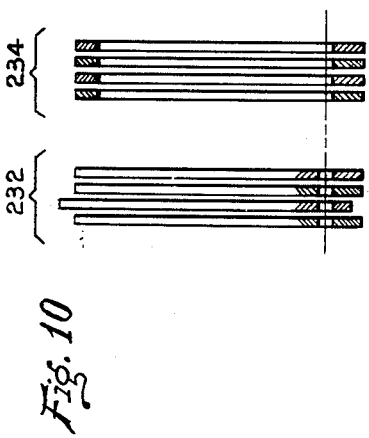

United States Patent Office 3,054,335
Patented Sept. 18, 1962

3,054,335
TYPE COMPOSING APPARATUS
Rene A. Higonnet, Cambridge, and Louis M. Moyroud, West Medford, Mass.
Filed June 12, 1958, Ser. No. 741,659
5 Claims. (Cl. 95—4.5)

The present invention relates to photographic type composing machines. More particularly, it is concerned with a very highspeed photographic-type composing machine wherein the information necessary to the transcription on film is stored in a tape.

The characters are preferably stored in a suitable register in full lines, rather than being transcribed immediately to the tape upon selection at the keyboard. This permits justification of the lines, whereby the right-hand margins are aligned before perforating the tape; and it also permits correction of erroneously selected characters. Correction is made possibly by permitting the operator to see the characters corresponding to the information stored in the register after each line has been composed, and to erase and correct any erroneous information in the register before transcription has begun.

A principal feature of the present invention resides in improvements in the machine generally described in our copending application Serial No. 627,501, filed December 10, 1956. These improvements make it possible to stop an otherwise continuously moving film carriage or prism carriage for certain functions of the machine such as size changes or style changes. Another object of the invention is the improvement of a photographic type composing machine using a multiplicity of static lenses to project any character of a font at a common point.

Another object of the present invention relates to the production of tape for use in photographic type composing machines provided with all the necessary information for transcription of a line, including all of the proper spacing information for line justification.

Another object of the present invention relates to improvements to tape reading systems where the tape is read by the use of small brushes.

Another object of the invention is an illumination system to produce a flash of light at any of a relatively large number of points by simple means.

Other features of the invention reside in certain structures, arrangements and modes of operation which will become apparent from the description to follow.

In the drawings,

FIGURE 6 shows a multiple font grid used in the machine;

FIGURE 7 is a detailed view to explain the automatic positioning of the images of the characters to get perfect alignment on the film;

FIGURES 8 and 9 show an illumination system which can be used in the machine;

FIGURE 10 shows a variant to the illumination system; and

FIGURE 11 illustrates one of the defects of known projection systems which defect is corrected by the invention.

Figure 1:
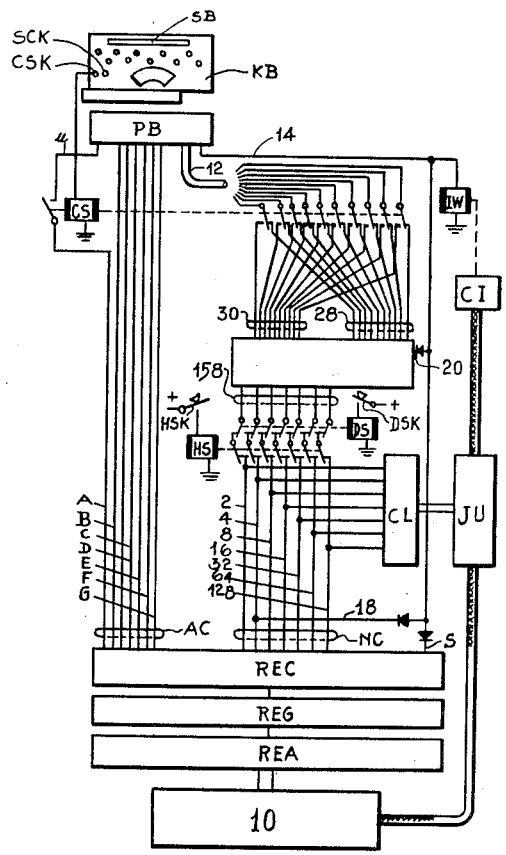
FIGURE 1 is a block diagram of a machine embodying the invention.

FIGURE 1 is a block diagram representing an entire type composing machine according to the invention. There is provided the usual keyboard unit KB having a key for each selected character (there being forty-five keys of this type in the illustrated embodiment), a space bar SB and a number of special keys. The keyboard unit is preferably adapted to provide a typed copy of the selected characters in the same manner as an ordinary typewriter. By this means the operator may check the characters after each line of typing to detect any errors.

In addition, the keyboard is adapted to actuate a permutation bar unit PB, which may be of the familiar form used in teletype apparatus. The unit PB has four output circuits. The first circuit is constituted by a universal wire $u$, which receives a temporary electrical impulse whenever any character key or the space bar is depressed. The second circuit is constituted by six wires B to G, inclusive, forming with a wire A an alphabetical code group AC. A distinct combination of these wires is similarly energized whenever any one of the character keys is depressed. The third circuit is constituted by a number of wires forming a cable 12. There is one wire in this cable for every character key (forty-five in the illustrated embodiment), and each wire is energized only when the corresponding key is depressed. The fourth circuit is constituted by a single wire 14 which is energized whenever the space bar is depressed.

The keyboard or an adjacent part of the machine accessible to the operator is also provided with a number of other keys. These include a case shift key CSK, by which the universal wire $u$ is connected to the alphabetical code wire A through energization of the case shift relay CS. A half-set key HSK is depressed to energize a half-set relay HS, thereby reducing the set width of any character to half its normal value. Similarly a double-set key DSK and a relay DS are operative to double the set width of any character.

The alphabetical code group AC of seven wires is connected directly with a recording unit REC, which transfers information to the register REG a character at a time. The unit REC may include a number of punches for a paper tape, one for each entry wire, but it preferably includes the solenoid-actuated hammers of the register of our Patent No. 2,690,249.

In addition to the alphabetical code group AC, there is a numerical code group NC leading to the recording unit. This group is constituted by seven wires, 2, 4, 8, 16, 32, 64 and 128, each wire having a binary order represented by its reference number. This code group is used to represent the width of each character, taking into account its case, relative width value and set. Finally, there is a single entry wire S which is energized with a wire 18 through the wire 14 to designate a word space entry in the register. Also, by means hereinafter described, a wire 20 which is energized at the same time transmits a width value indirectly to the numerical code group NC, this width value being the minimum value assigned to each word space.

The numerical code group NC is also connected with a line counter CL, which is preferably a binary relay accumulator of the type described in our Patent No. 2,682,-814. This counter accumulates the widths of the selected characters in a line, whereby it is possible to determine the additional increments or spaces that must be added to the minimum word spaces, or, if desired, between each pair of adjacent characters to justify the line.

The determination of justification increment sizes is made in a suitable justifier JU, which may be, for example, of the type described in our Patent No. 2,682,814. To this end, an interword (word space) counter CI is also connected with the justifier. The counter CI may be a stepping switch as described in the last-mentioned patent, which steps one position each time the space bar is depressed through operation of an interword relay IW by the wire 14.

When an entire line of characters has been registered, the operator may read the unjustified copy produced at the keyboard to detect any errors therein. If there are no errors, a suitable carriage return key (not shown) may be depressed. This key returns the platen of the typing unit and initiates the transcription of the stored line in the usual manner. At any time before this key is depressed, the operator may return the platen of the typing unit to the position of any character to be corrected, and erase and correct the corresponding information in the register REG and the line counter CL. This is made possible in a mechanical register by a mechanical connection between the recording unit REC and the platen of the typing unit, as fully described in said Patents Nos. 2,690,249 and 2,682,814. According to these patents, a group of contact-closing sensing levers are lifted to detect the binary width value of the erroneous character, and an erasing mechanism is then moved to retract the pins.

After the line has been composed and corrected, the information in the register is read by a suitable reading device REA, a character at a time, and transferred to a tape punch 10 in such a way that all of the information necessary to the transcription of a justified line will appear in the punched tape. To this effect, the punch 10 receives not only the information from the reading device REA, but also at the appropriate times, additional information from the justifier JU for proper spacing between words.

The product of the typing unit or recording section of the machine is thus a corrected tape bearing all the necessary information to operate the photographic unit without having to wait for additional operations such as justification computations. This enables the photographic section of the machine to run at considerably higher average speeds than it would be possible if the tape were not an exact representation of the line. It should be clear at this point that our methods differ from the known systems of recording a line on a punched tape with the justification information punched at the end of each line on the same tape, thus requiring additional reading and computation at the photographic unit.

The character selection and projection system will now be described.

Figure 4:
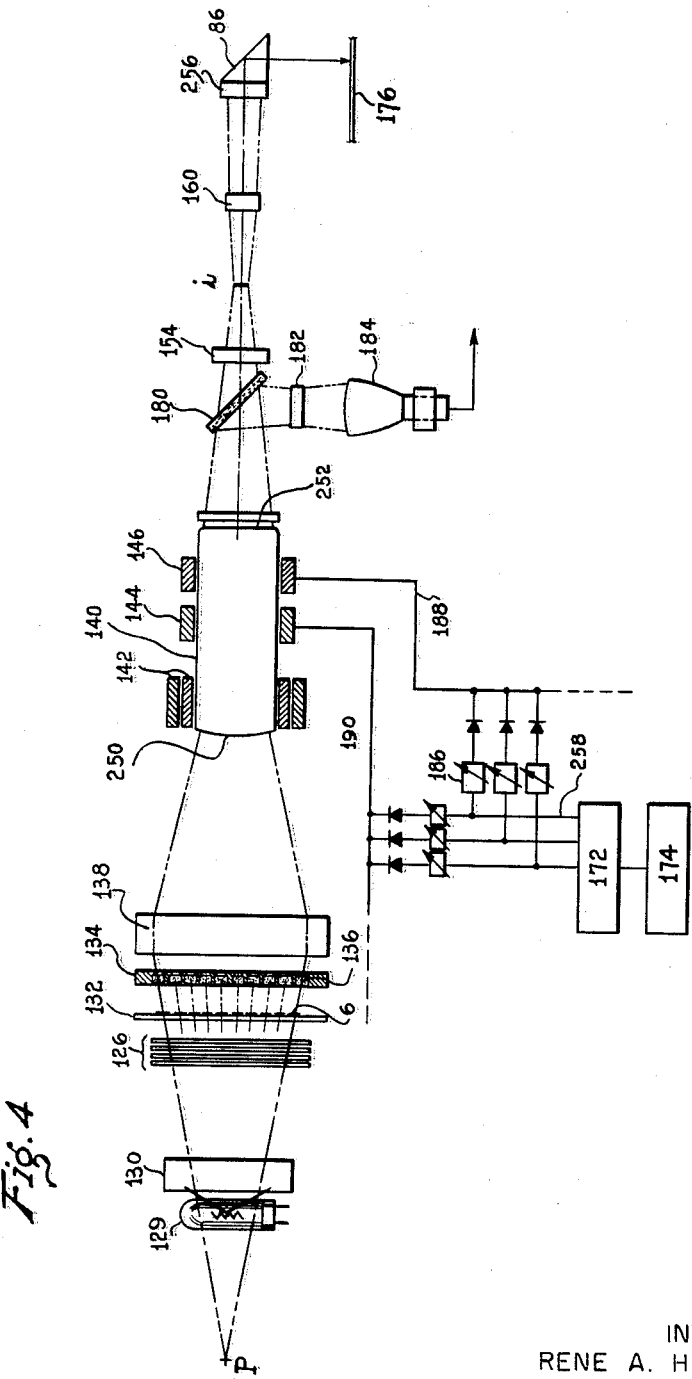
FIGURE 4 is a diagram showing schematically the character selection of the machine.
Figure 5:
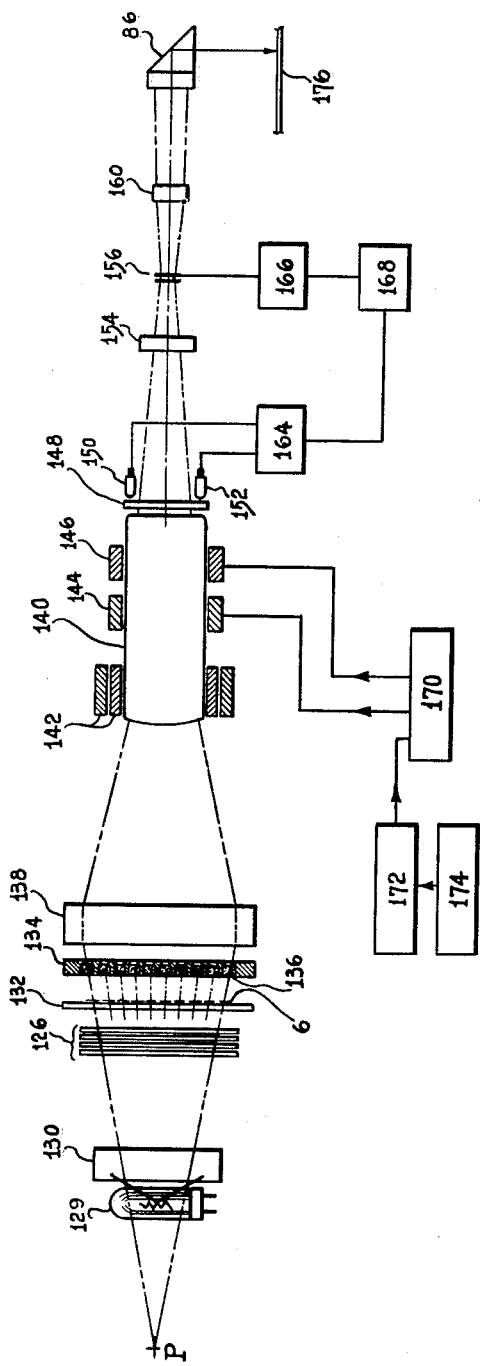
FIGURE 5 is a diagram showing an alternative arrangement of the character selection and projection used in the machine.

The machine described preferably uses a static projection system, i.e., a system wherein any of a series of characters representing at least one complete alphabet can be projected at a common point without having to move any mechanical parts, except shutters. Systems of this kind have been described in French Patent No. 992-584, FIGURE 3, and also in our patent No. 2,781,806, but the arrangement shown on FIGURES 4 and 5 is preferred and makes use of the optical system described in French Patent No. 799,460. In this arrangement a matrix grid such as the one shown in FIGURE 6 is used, there being associated with each character to be projected simultaneously with other characters a small lens 136. Each character 6 is transparent on an opaque background and is associated to a small lens 136 positioned in such a way that all these lenses will make a virtual image of their associated characters at a common point P, as described in the above-mentioned French patent. A large collecting lens 138 is positioned to make a real image from this virtual image at $i$ (FIGURE 11). The whole array of characters is illuminated by a lamp 129 and a condenser 130 positioned so that the filament of the lamp appears to be at point P. A group of shutters 126 can be controlled to illuminate only one character at a time. The illuminated character is projected considerably enlarged onto the cathode 250 of a tube 140 (FIGURE 4). This tube is of a well-known type called an "image converter" and transforms the visible light into a beam of electrons which are focused to the other end of the tube to give again a visible light. The purpose of this tube is to obviate the two main disadvantages of any kind of static multiple lens arrangement proposed hitherto for use in photographic type composing machines.

The first disadvantage which is overcome by the present arrangement relates to the difficulty of aligning with accuracy the individual lenses 136 all mounted on a single plate 134. According to the invention these lenses do not have to be aligned, the correction being automatically made by the tube 140 and associated circuitry to bring all the characters to the same alignment, even though they would be projected slightly out of alignment if it were not for the presence of this tube.

The second difficulty of the multiple lens arrangement systems resides in the loss of light due to a widely divergent beam. This should be clear by the examination of FIGURE 11 where, for example, the top lens will, after making an image at the common point "$i$" form a beam 260 slanting down while the bottom lens will form a beam 262 going upwards. That means that in order to change the size of the characters, lenses of considerably larger diameter such as 264 would have to be used, so large that the system is practically confined to very little magnification or enlargement. We obviate this difficulty by the use of tube 140 (FIGURES 4 and 5) which produces at its anode 252 an image on a fluorescent screen which can be refocused by a lens 154 to make a real image "$i$," which in turn can be refocused by the selected one of a series of lenses 160 of differing magnifications mounted on a lens turret. This lens projects an image onto a film through the optical system described in the patent to Caldwell No. 2,670,665 comprising a prism 86. The tube 140 is provided with a focusing coil 142 and deflecting coils 144 and 146 which could be replaced by deflecting plates inside the tube. The coil 144 deflects the beam vertically while the coil 146 deflects the beam horizontally. In order to align all the characters each master character on the grid 132 (FIGURE 6) is provided with two reference lines 194 and 197, one for horizontal alignment and the other for vertical alignment, as shown in FIGURE 7, and matching transparent lines are scribed on an opaque background on the screen 252 so that each character can be brought in exact alignment by bringing these two pairs of lines, the one projected and the one scribed, into perfect coincidence. This registration is achieved by the use of multiple potentiometers such as 186 (FIGURE 4), there being one pair for each character, one of them being used to control the vertical displacement while the other one is used to control the horizontal displacement. The alignment is made by using a tape bearing the code of all the characters of the alphabet and passing this tape through the tape reader 174 and decoder 172. The tape is advanced one step at a time, and each time a character is projected onto the screen 252 by the proper actuation of the shutter 126. The purpose of the decoder 172 is to activate one wire such as 258 for each individual character. Each of these latter wires is divided into two sections, one going to the vertical control wire 188 and the other to the horizontal control wire 190. The operator watches the formation of the character image on the screen 252 and manipulates the potentiometers (or other equivalent adjustable circuit elements) to bring the reference lines of the character which is being projected to perfect registration with the scribed lines of the observing screen. Thus the alignment has to be made for each character individually and of course for each machine; but this procedure makes it possible to use a multiplicity of small inexpensive lenses and also reduces the size of the machine since no means for the accurate alignment of these lenses has to be provided.

A beam splitting mirror 180 associated with a lens 182 projects the same image onto a tube 184 which may be part of a closed circuit television system so that the image which is projected onto the film can also be projected onto a viewing screen close to the operator who can thus follow the composition as he types or as tape is being fed through the machine.

The arrangement shown in FIGURE 5 is similar to the one shown in FIGURE 4 except for the means for accurate positioning of the character images. In this alternative arrangement each letter is brought to exact horizontal and vertical alignment automatically. To this effect we use two photocells 150 and 152 which are also shown in FIGURE 7. The deflection elements 144 and 146 receive a potential before the projection of each character of a value such that the character most out-of-alignment would be brought to a position to the left and below the positions of the extensions of the lines 194 and 197 shown in FIGURE 7. These deflection elements are associated with circuitry well-known in the art so that the vertical reference line 197 will continuously move to the right as shown in FIGURE 7, and the horizontal line 194 will continuously move upward as shown in FIGURE 7. These sweeping actions will immediately stop as soon as each line has reached its respective photocell; the action of the light passing through the lines to activate the photocells stops either the vertical or the horizontal action. These two sweeping actions do not normally stop simultaneously, but the first luminous line which would reach its associated photocell stops its particular sweeping circuit while the other sweeping action proceeds until the second photocell is reached by its associated luminous reference line. When these reference lines have thus been aligned with the photocells, the sweeping action, vertical and horizontal, is stopped by a circuit, not shown in detail as similar circuits are well-known. This circuit could be in the box 170 controlled by register 174 and decoder 172. As soon as both photocells have received the light of their associated reference lines a circuit 164 sends a signal to another circuit 168 which energizes a shutter control circuit 166 in order to move a shutter 156 out of the path of the beam of light forming the character. As soon as the shutter has been returned to again obturate the beam of light, the deflection circuits are actuated for the next character, i.e., the potentials of the deflection elements are returned to their original values which would move the next character below and to the left of the illustrated position as stated above.

We preferably use in this machine a matrix grid bearing a complete assortment of characters comprising four different styles, for example, "Roman," "Italics," "Bold" and "Small Caps." Each of these styles comprises the complete upper case and lower case alphabet, numerals, punctuation marks, etc., the number of different characters generally being 90. These four different type faces are on a common plate 132, FIGURE 6. In this figure the little crosses represent the Roman alphabet, the "x's" represent the Italic alphabet, the black dots represent the Bold alphabet and the white dots represent the Small Caps and other special signs. In its normal position as shown in FIGURE 6 the grid 132 is resting in the angle of a supporting member 206. This grid can move upwards and to the right in its own plane, the displacement to the right being effected by a solenoid 210 and a roller 212, and the displacement upward by a solenoid 214 and a roller 216. There is only one lens for each group of four characters, i.e., there is only one lens for the "A" whether it is an Italic A or Roman A or Bold A or Small Cap A.

In the example shown each lens is aligned with the little crosses, there being as many lenses as there are little crosses. These lenses are located in reasonably accurate relationship to these crosses in order to make a virtual image of each character at a common point P as shown and explained above. In order to shift from Roman to Italics the solenoid 210 is energized which pushes the grid against the action of spring 208 to the right until the same grid is accurately located by stops 202 and 204. If it is desired to go from Roman to Bold, solenoid 214 is energized and the grid is pushed upward and accurately located by the stops 200 and 202. By the same procedure we can shift from Roman to Small Caps by energizing simultaneously solenoids 210 and 214 which moves the plate to the right and upward against the accurately positioned stop 202. As is well-known, shift signals should be stored on the punched tape in order to effect any of these changes of style from Roman to Italics or Bold or Small Caps.

The machine described operates according to the broad principles disclosed in our said application Serial No. 627,501. In the example shown, however, we use the optical system described in our Patent No. 2,670,655 rather than the one shown in said application. The two systems are, of course, both adapted for use in conjunction with the present invention. It is clear that with the system described using a continuously moving prism or film carriage associated with a stationary optical system and a pulse generator and pulse counter to control the flashing time of selected characters in such a way that the spacing on the film will be appropriate, some means have to be incorporated into the machine to stop the moving prism carriage or film carriage accurately when a shift is made. Experience has shown that it is very difficult to stop with high accuracy and start, also at a precise instant, a moving member such as the film carriage or prism carriage in a photographic type composing machine. According to one of the characteristics of the present invention we do not try to stop the prism or film carriage with high accuracy, but we count accurately the time interval during which the shifts take place. The operation of the machine for a shift signal will now be described with reference to FIGURE 2.

Figures 2, 3:
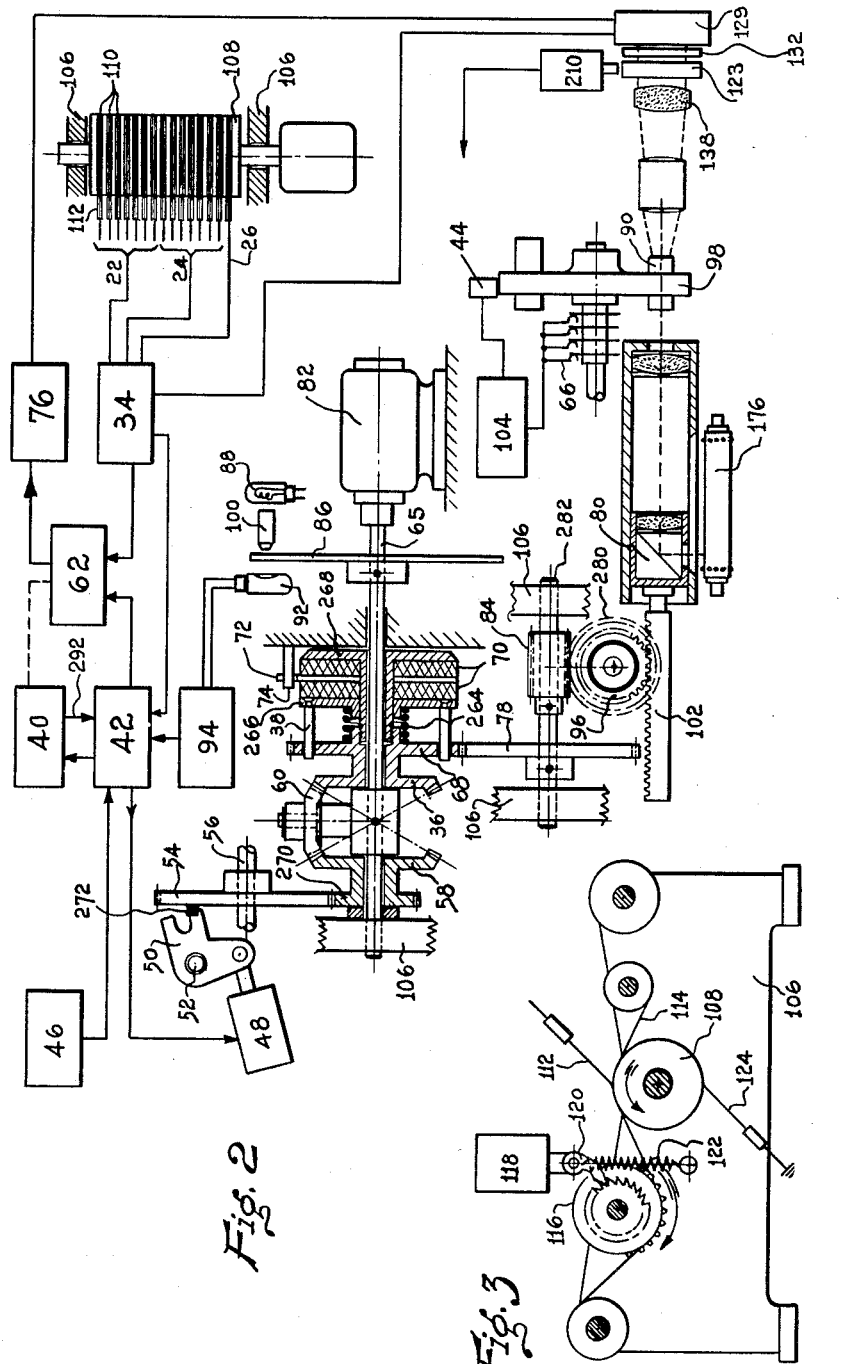
FIGURE 2 is a block diagram schematically representing the photographic or transcribing unit of the machine.
FIGURE 3 shows schematically the tape reader used in the machine.

The general arrangement shown in FIGURE 2 is basically the same as the one described in our said application Serial No. 627,501 except for the addition of certain features which are peculiar to the present invention. A motor 82 drives continuously, for example at a speed of 5 revolutions per second, a shaft 65 on which is pinned a glass disc 86. This disc carries on its periphery a number, for example 400, of transparent slits on opaque background. An exciter lamp 88 projects thru a microscope 100 a luminous slit of great intensity onto the plane of the continuously rotating disc. A photocell 92 receives these luminous pulses and transforms them into electrical pulses which are sent to an amplifier 94. The electrical pulses emerging from 94 are sent to a counter 62 via a shift control circuitry 42. The counter 62 is used in a manner similar to the counted described in the previously mentioned application Serial No. 627,501.

This counter is used to trigger the flash control circuit 76 which in turn energizes the illumination device 129 (FIGURE 4 or 5) to project the selected character onto the film. The selection of characters is made by decoder 34 which allows the proper shutter to be operated or selects one of a multiplicity of equivalent small flash light sources. This decoder is also connected to the shift control 42 and solenoids such as 210 which select which one of the different styles carried by plate 132 mounted on frame 123 should be in operating position. The illuminated character is projected thru a group of lenses onto the lens 90 mounted on a lens turret 98 provided with a number of lenses of different focal lengths enabling the projection of characters of different sizes. The light emerging from the lens turret reaches the optical system generally described by 80 which is similar to the one shown in said Patent 2,670,665.

The film is schematically represented at 176. The displacement of the prism shown at 80 of the optical system used for the projection of the characters is controlled by a rack 102. This rack is engaged by a pinion 96, driven by a worm gear 280 engaged by a worm 84 mounted on a shaft 282 rotating in the general framework 106 of the machine and driven by a gear 78 engaged by another gear 68. Gear 68 is part of a differential arrangement comprising bevel gears 58, 60 and 36. Gear 60 rotates freely on the spider of the differential which is pinned to the continuously rotating shaft 65. Gear 68 is loose on shaft 65 but is driven by pinion 38 mounted on a friction device of the type shown in our copending application Serial No. 590,304, filed June 8, 1956. This friction device consists mainly of two friction discs 70 squeezed by a spring 264 between steel discs 266 and 268. Another steel plate 72 is held stationary by a finger 74 mounted on the general frame of the machine. It is clear that this arrangement gives a continuous drag and acts like a continuously applied brake on the gear 68. The other side of the differential arrangement comprising the bevel gear 58 and the gear 270 is prevented from rotating by a gear 54 meshing with gear 270 and provided with a lug 272 engaged by a pawl 50 pivoted at 52 and controlled by a solenoid 48. Gear 54 can rotate freely on shaft 56 but as appears in the drawing, is prevented from doing so by the engagement of lug 272 by pawl 50. As gear 54 is prevented from rotating by the arrangement just explained, gear 270 will also be held stationary so that gear 36 and consequently gear 68 will be forced to rotate against the action of the friction 70. It is thus clear that, as long as the different elements are as shown in the figure, gear 68 will continuously drive gear 78 and consequently continuously move prism 80 in the direction corresponding to the normal composition of characters for a line of text.

Thus, for a line which does not necessitate any style shift or lens shift the prism will move continuously from the first character of the line to the last character of the line, as described in the previously mentioned application Serial No. 627,501, and each character will be flashed at exactly the right time for accurate spacing on the film. This timing is controlled by counter 62 which is pre-set by decoder 34, by an amount corresponding to the width of the characters to be projected or which have been projected, the two methods being equivalent. When a shift signal is read by the tape reader it is clear that the prism carriage should be stopped as a certain time will be necessary to allow for the shift to take place. In the example shown, disc 86 rotates at 5 revolutions per second and the gear ratio between shaft 64 and rack 102 is such that this rack moves at a speed of approximately 1½ inches per second. It is clear that at this speed it would be very difficult to stop very instantly for one or two hundred milliseconds, the otherwise continuously moving optical system without losing part of the accuracy which is required for good typography. One of the most important characteristics of the present invention is to avoid the necessity for this exact and instantaneous stopping of the moving elements when a shift is to take place. To this effect we use in addition to the differential arrangement which has been described, an auxiliary counter 40. This counter can accumulate a number of electrical pulses, for example 400. In the example shown, this capacity represents a time of ⅕ of a second, or 200 milliseconds. We allow for any shifts a time which is a multiple of this time. Generally the shift time is less than 200 milliseconds, which means that the auxiliary counter 40 takes longer to be full than it takes to shift, for example, from one style to another style. When a shift signal is read by the brushes 22 and 26 of a tape register in which the line is stored, the decoder 34 actuates the shift control circuitry 42 which switches by electronic means the pulses coming from amplifier 94 from counter 62 to the auxiliary counter 40. At the same time a signal is sent to solenoid 48 to allow dog 272 to escape pawl 50. Gear 54 is thus allowed to make one revolution and the displacement of the prism carriage will be stopped. This action, however, will not be instantaneous because of the friction-differential arrangement, but the operation will rather be a smooth stopping of gear 68 and consequently of the whole optical equipment and a gradual starting of gear 54. If we assume that the disc or lens shift is completed before gear 54 has made a complete revolution, the mechanical shift circuit 46 sends a signal to shift control circuit 42 which releases solenoid 48 in order to stop gear 54, after it has rotated exactly one revolution. During all this time the pulses emerging from amplifier 94 have been sent to the auxiliary counter 40. The purpose of this counter is to lose these pulses or, in other words, to prevent these pulses from reaching the counter 62 which controls the flash circuit. It is evident that the capacity of the auxiliary counter 40 should correspond exactly to the number of pulses which are generated during one revolution of gear 54 which in the present embodiment corresponds to one revolution of shaft 64. As soon as counter 40 has reached full capacity the carry-over pulse is returned to shift control 42 through wire 292 for the purpose of switching back the impulses emerging from 94 to the counter 62. The normal operation of the machine is then resumed.

It should be pointed out that the fact that the prism carriage may have moved a little after the shift signal had reached the decoder is of no importance as long as this displacement is less than the narrowest character which can be used in the machine. What is important is the fact that the shift signal has immediately transferred the pulses from the flash controlling counter to the auxiliary counter in order to lose a number of pulses corresponding to the time it takes for gear 54 to accomplish one of an integral number of revolutions. The small motion of gears 36 and 38 which occurs after the shift signal has reached the shift control 42 and before or at the same time as gear 54 has started rotating has no effect on the positioning accuracy of the following character because this displacement of gear 68 and associated elements will increase the time it takes for gear 54 to make one revolution. The same number of pulses, that is to say 400, in the example described, will in any case be sent to the auxiliary counter 40 which means that the loss of pulses corresponds exactly to the loss of motion of the rack 102, whatever is the value of the residual displacement. The influence of any displacement of the rack 102 through gear 68 after the shift signal has reached the circuitry is to slow down the speed of gear 54. We could, for example, assume that with no friction 70 and equal load on both sides of the differential, gears 270 and 36 or 68 would rotate at the same speed as shaft 64, and the effect would be to slow down by one-half gear 54 which would thus require two revolutions of fixed disc 86 to make one full revolution. During these two revolutions 800 pulses would be sent to the auxiliary counter which would accept only 400 pulses and send the other ones to the flash circuit to prepare the circuit to flash the next character thus compensating for the "residual" motion of the prism carriage. The displacements of rack 102 after the shift signal has energized the control circuit 42 are consequently always counted for the timing of the flash. In certain cases such as in the case of a lens turret shift, it may be that 200 milliseconds are not long enough to allow for the shift to be completed. In this case the shift mechanism by means not shown does not send a signal to shift circuit 46 to advise this circuit that the shift is completed, and in this case the absence of signal will allow the switching circuit 42 to continue to send pulses for another group of 400 pulses to auxiliary counter 40, and this as many times as required. The pulse shift control 42 to be effective should receive first a signal from circuit 46 to advise that the shift is completed and prepare the circuit 42 to shift pulses back to counter 62, as soon as a carry-over appears on wire 292.

The tape 114 is run through the tape reader as shown in FIGURE 3. This tape reader is characterized by a continuously rotating drum 108 made of insulating material with a number of conducting rings, there being one ring for each scanning brush 112. The other side of the ring makes contacts with common brushes 124 connected, for example, to the ground of the machine. This arrangement is very effective in that the brushes made contact with a continuously moving surface which prevents occasional bad contact due to little insulation particles such as dust. The tape is stopped, one row at a time, by a solenoid 118 provided with a pawl 120 working against a spring 122. Pawl 120 engages a ratchet mounted on the sprocket 116 in a manner well-known to a man skilled in the art. As described in our copending application Serial No. 500,397 and shown in FIGURE 1, we preferably use a tape with 15 holes, there being seven holes associated with seven brushes 22, FIGURE 2, corresponding to the alphabetical selection of characters, and another group of seven holes scanned by seven brushes 24, corresponding to the width selection of characters, and another hole associated with a brush 26, which is more specifically used for shifts such as lens turret shift or style shifts. In order to add a flash of short duration while the film or prism carriage is in motion, the lamp 129 shown in FIGURES 4 and 5, is preferably an electronic flash lamp like the one used in the machine described in Patent No. 2,790,362.

According to another arrangement we provide a grid system which allows any of a series of points equal in number to the number of character lenses to become luminous for a very short period. This arrangement is shown schematically on FIGURES 8 and 9. A group of wires of special material is arranged as shown, there being an equal number of vertical wires such as 226 and horizontal wires such as 228. Relay contacts 218 and 220 enable the selection of any one of the group of vertical wires and any one wire of the horizontal group. These wires are spaced by a short distance, for example, a few thousandths of an inch, so that a spark can appear between two selected wires at the point where they cross each other. These wires can be mounted into holders such as 222 for horizontal wires and 224 for vertical wires made of proper transparent and insulating material. These holders shown separated on FIGURE 9, are cemented one against the other and are provided with little cavities so that after the two parts are assembled these cavities can be evacuated and filled with the appropriate gas such as xenon. The selection of one vertical wire and one horizontal wire having been made by relays, the flash control 38 is energized by the decoder of the machine. Through means not shown but well-known in the art, a high voltage is sent to selected wires in order to obtain a discharge of short duration which will illuminate one of the different little recesses of plates 222—224. An alternative type embodying a mechanical shutter is shown in FIGURE 10. In this case two groups of shutters are shown, for example a group 232 provided with four blades and a group 234 provided also with four blades. These shutters operate in a manner similar to the ones described in our Patent No. 2,744,457. One group of shutters opens a horizontal slot of the width of the character and the other group opens one vertical slot of the height of the characters. By the proper operation of each of these groups of shutters we can thus open a hole at the spot where the desired character is located. These shutters are operated from the decoder by solenoids in a manner similar to the one described in said Patent 2,744,457.

Having thus described the invention, we claim:

1. Photocomposing apparatus having, in combination, a support for a number of characters to be projected, optical means including a plurality of lenses each corresponding to a character, said means being adapted to form images of the characters approximately in a common position on a first plane, selector means to project the image of a selected character through said optical means, an electronic image transfer tube having a cathode in said position to transpose said image to a second plane and having deflection means to deflect said image on said second plane, said tube having a luminescent screen in said second plane, connections associated with said selector means to cause a deflection of the image in said second plane to compensate for the deviation of the image from said common position, and optical means to project the image in said second plane on to a sensitized sheet.

2. Photocomposing apparatus having, in combination, a selector circuit having a connection for each of a plurality of characters to be selected, a support for said characters, optical means including a plurality of lenses each corresponding to a character, said means being adapted to form images of the characters approximately in a common position on a first plane, selector means to energize the connection for a selected character to project its image through said optical means, an electronic image transfer tube having a cathode in said position to transpose said image to a second plane and having deflection means to deflect said image on said second plane, said tube having a luminescent screen in said second plane, circuits from each of said connections to said deflection means including means to cause a deflection of the image on said second plane to compensate for the deviation of the image from said common position, and optical means to project the image in said second plane on to a sensitized sheet.

3. Photocomposing apparatus having, in combination, a selector circuit having a connection for each of a plurality of characters to be selected, a support for said characters, optical means including a plurality of lenses each corresponding to a character, said means being adapted to form images of the characters approximately in a common position on a first plane, selector means to energize the connection for a selected character to project its image through said optical means, an electronic image transfer tube having a cathode in said position to transpose said image to a second plane and having deflection means to deflect said image on said second plane, said tube having a luminescent screen in said second plane, circuits from each of said connections to said deflection means including impedances adjusted to cause a deflection of the image on said second plane to compensate for the deviation of the image from said common position, and optical means to project the image in said second plane on to a sensitized sheet.

4. Photocomposing apparatus having, in combination, image transfer means having an input image screen, provision to form an electron beam shaped like an image formed on said screen and a luminescent screen upon which a real image is formed by the beam, said transfer means also having means for independently deflecting the beam in two dimensions and said luminescent screen having an opaque portion provided with an index aperture for each of said dimensions, means to form on said input image screen an image of a character to be projected and index marks accurately spaced in two dimensions relative thereto, photocells in position to receive light from said apertures, means to energize said deflecting means to cause the image on the luminescent screen to move progressively until said marks illuminate said apertures, and means responsive to the photocells to project the image on said luminescent screen on to a sensitized sheet while the marks are opposite said apertures.

5. Photocomposing apparatus having, in combiantion, an electronic image transfer tube having an input image screen, a luminescent screen and provision to form an electron beam shaped like an image formed on said input image screen and to form a real image thereof on said luminescent screen, a support for the characters to be selected external to the tube, selection means for forming real images of selected characters successively in approximately a common position on the input image screen, optical means to project the image on said luminescent screen on to a sensitized sheet, means for producing relative movement between the sheet and the character images formed thereon, and deflection means associated with the tube to deflect the image on said luminescent screen to compensate for deviations of the image on the input image screen from said common position.

References Cited in the file of this patent

UNITED STATES PATENTS

| | | |
|---|---|---|
| 2,180,417 | Huebner | Nov. 21, 1939 |
| 2,283,383 | McNaney | May 19, 1942 |
| 2,379,880 | Burgess | July 10, 1945 |
| 2,603,418 | Ferguson | July 15, 1952 |
| 2,745,092 | Moorhead | May 8, 1956 |
| 2,764,071 | Huebner | Sept. 25, 1956 |
| 2,805,749 | Kleinschmidt | Sept. 10, 1957 |
| 2,808,768 | Squassoni | Oct. 8, 1957 |
| 2,875,370 | Young | Feb. 24, 1959 |
| 2,896,523 | Tansel | July 28, 1959 |
| 2,917,980 | Grube | Dec. 22, 1959 |